United States Patent
Foster et al.

(10) Patent No.: US 6,761,333 B2
(45) Date of Patent: Jul. 13, 2004

(54) METHOD OF AND APPARATUS FOR RELEASING STORES FROM AN EJECTION RACK

(75) Inventors: John K. Foster, St. Peters, MO (US); Thaddeus M. Jakubowski, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/310,569

(22) Filed: Dec. 4, 2002

(65) Prior Publication Data

US 2004/0108415 A1 Jun. 10, 2004

(51) Int. Cl.[7] .............................................. B64D 1/12
(52) U.S. Cl. ..................... 244/137.4; 89/1.54; 60/407
(58) Field of Search ....................... 244/137.4; 89/1.53, 89/1.54; 60/407

(56) References Cited

U.S. PATENT DOCUMENTS

| | | | |
|---|---|---|---|
| 3,738,609 A | * 6/1973 | Divigard | 137/79 |
| 4,031,950 A | * 6/1977 | Shultz | 165/259 |
| 4,095,762 A | 6/1978 | Holt | |
| 4,204,456 A | 5/1980 | Ward | |
| 4,336,590 A | * 6/1982 | Jacq et al. | 128/204.21 |
| 4,355,280 A | * 10/1982 | Duzich | 324/207.12 |
| 4,905,568 A | 3/1990 | Hetzer et al. | |
| 4,964,595 A | * 10/1990 | Nordhaus | 244/137.4 |
| 5,583,312 A | 12/1996 | Jakubowski, Jr. | |
| 5,605,043 A | * 2/1997 | Dimmock | 60/407 |
| 5,907,118 A | 5/1999 | Jakubowski, Jr. et al. | |
| 6,035,759 A | 3/2000 | Jakubowski, Jr. et al. | |
| 6,119,982 A | * 9/2000 | Jakubowski et al. | 244/137.4 |
| 6,302,249 B1 | * 10/2001 | Jolly et al. | 188/269 |
| 6,347,768 B1 | 2/2002 | Jakubowski, Jr. et al. | |

* cited by examiner

*Primary Examiner*—Michael J. Carone
*Assistant Examiner*—Daniel Matz
(74) *Attorney, Agent, or Firm*—Thompson Coburn LLP

(57) ABSTRACT

A method of ejecting or jettisoning stores from an aircraft is disclosed that pertains essentially to the over-pressurizing of an on-board gas storage system such that the pressure of the gas stored therein remains at or above the proper pneumatic actuation pressure during all foreseeable temperature ranges. When a control signal to release a store is provided, the pressure of the gas is reduced to be within the desired pneumatic actuation pressure and the gas is then used to release the store. The present invention eliminates many of the concerns associated with prior art ejection systems by providing a method of supplying proper pneumatic actuating pressures during store release without the need for on-board compressors or heating elements.

25 Claims, 1 Drawing Sheet

METHOD OF AND APPARATUS FOR RELEASING STORES FROM AN EJECTION RACK

BACKGROUND OF THE INVENTION

Aircraft, particularly military aircraft, often utilize racks located beneath their wings and/or fuselages to carry stores and to release such stores from the aircraft upon command. The stores typically are munitions such as bombs, missiles, and rockets, but also include other items such as fuel tanks.

Typical store racks are shown in U.S. Pat. Nos. 4,043,525 and 4,347,777, which are incorporated herein by reference, in their entireties. As is well known, store racks typically include a release mechanism for selectively releasing a store from the aircraft upon command and often include one or more ejector rams for forcibly ejecting stores from the aircraft during their release. It is also known that various means can be used for actuating the release mechanisms and/or the ejector rams. Such means may include compressed springs, pyrotechnic cartridges, hydraulic systems, and pneumatic systems. Additionally, the release mechanisms and the ejector rams of any given store rack may be actuated via the same source of power or via separate unrelated sources of power.

The present invention pertains particularly to pneumatically actuated store racks, which have increasingly been utilized for supplying the power to the ejector rams to forcibly eject stores. Pneumatically actuated systems have several advantages including low weight, high reliability, low maintenance requirements, and operational safety.

Typically, compressed gas is supplied to a pneumatically actuated ejection system via a compressed gas storage system that, during flight and prior to the release of a store, maintains the compressed gas at a pressure sufficient to properly operate the ejection system. Because of this, several issues are of concern when utilizing pneumatically actuated ejection systems. In particular, throughout the flight of an aircraft, the gas storage system may vary in temperature by as much as over 200 degrees Fahrenheit. Such temperature variances can cause substantial changes in the pressure of the compressed gas stored in the gas storage system. This is a problem because, in many cases, the pneumatically actuated ejection systems are configured to be operated using compressed gas within fairly narrow and specific pressure ranges. As such, numerous methods have been developed and utilized to ensure that the gas stored in the gas storage system is maintained within the proper operating pressure range of the ejection system. One such method is to utilize an on-board heat source for heating the compressed gas within the gas storage system so as to increase the pressure of the compressed gas as needed. Another method is to provide an on-board gas compressor for adding additional compressed gas to the gas storage system to thereby increase the pressure of the stored gas as needed. It is also known to utilize vent valves to decrease the pressure of the stored gas as needed.

Despite the various developments and improvements associated with pneumatically actuated store rack ejection systems, there nonetheless remains room for further improvement.

SUMMARY OF THE INVENTION

The present invention eliminates many of the concerns associated with prior art ejection systems by providing a method of and apparatus for supplying proper pneumatic actuating pressures during store release without the need for on-board compressors or heating elements. In simple terms, the method and apparatus of the invention pertains essentially to the over-pressurizing of an on-board gas storage system such that the pressure of the gas stored therein remains at or above the proper pneumatic actuation pressure throughout all foreseeable temperature ranges. When a signal to release a store is provided, the pressure of the gas is reduced to be within the desired pneumatic actuation pressure and is then used to release the store.

In general, a first method of practicing the invention comprises the steps of providing an aircraft having a store rack and a gas storage system and attaching a store to the store rack. Compressed gas is supplied to the gas storage system via a source of compressed gas in a manner such that the gas storage system contains an amount of compressed gas. During flight, when a response signal to release the store is provided, the pressure of at least a portion of the amount of compressed gas is decreased. That portion of the compressed gas is then used to actuate the store rack and thereby jettison the store from the aircraft.

A second method of practicing the invention comprises providing a similar aircraft and attaching a store to the store rack. This method further includes supplying compressed gas to the gas storage system via a source of compressed gas in a manner such that the gas storage system contains an amount of compressed gas that has a pressure-to-temperature ratio of at least 12.0 psia/°R. The source of compressed air is then separated from the aircraft and during flight, the pressure of at least a portion of the amount of compressed gas is decreased to an actuation pressure that is within a range from 4,750 psia to 5,250 psia. Finally, the portion of the amount of compressed gas is used to actuate the store rack and thereby jettison the store from the aircraft.

A third method of practicing the invention, once again, comprises providing a similar aircraft and attaching a store to the store rack. This method further includes predicting a minimum operational temperature of compressed gas within the gas storage system during flight of the aircraft. The prediction is made with the assumption that energy is not added to the compressed gas during flight from any power source other than from ambient conditions surrounding the aircraft (which would not be the case if the gas was heated by aircraft systems or if additional compressed gas was added). This method yet further comprises identifying a desirable pressure range of compressed gas for pneumatically actuating the store rack (i.e. a minimum pressure limit and a maximum pressure limit). An initial pressure for supplying the gas storage system with compressed gas is determined in such a manner that the initial pressure would be sufficient to ensure that the compressed gas would have a pressure of at least the minimum pressure limit if the compressed gas were to have a temperature equal to the minimum operational temperature limit. Compressed gas is supplied to the gas storage system at the initial pressure. Finally, the pressure of at least a portion of the amount of compressed gas is decreased to be within the desirable pressure range and the portion of the amount of gas is then used to actuate the store rack and thereby jettison the store from the aircraft.

A first apparatus in accordance with the invention preferably comprises an aircraft, an amount of compressed gas, a store, a vent valve, a stores management system, and a dump valve. The aircraft has at least one pneumatically actuated store rack and a gas storage system and the amount of compressed gas is stored within the gas storage system. The store is attached to the store rack. The vent valve is operatively connected to the gas storage system and is selectively movable between opened and closed positions. In the opened position, the vent valve allows the amount of compressed air to communicate with an environment surrounding the aircraft and to pass through the vent valve. In the closed position, the vent valve prevents the amount of compressed air from passing through the vent valve to thereby communicate with the environment surrounding the aircraft. The stores management system is operatively connected to the vent valve and is configured to transmit a control signal indicative of an intent to release the store from the store rack. The vent valve is responsive to the control signal in a manner such that the vent valve is selectively moved from the closed position to the opened position in response to the control signal. The dump valve is also selectively movable between opened and closed positions. In the opened position, the dump valve allows the amount of compressed air to pass therethrough and to thereby actuate the store rack. In the closed position, the dump valve prevents the amount of compressed air from passing therethrough. Finally, the dump valve is also responsive to the control signal in a manner such that the dump valve is selectively moved from the closed position to the opened position in response to thereto.

A second apparatus in accordance with the invention preferably also comprises an aircraft, an amount of compressed gas, a vent valve, and a dump valve. Again, the aircraft has at least one pneumatically actuated store rack and a gas storage system and the amount of compressed gas is stored within the gas storage system. The amount of compressed gas is at a pressure in excess of 8,000 psia. The vent valve is operatively connected to the gas storage system and is selectively movable between opened and closed positions. The opened position of the vent valve allows the amount of compressed air to be in communication with an environment surrounding the aircraft and to pass through the vent valve. The closed position of the vent valve prevents the amount of compressed air from passing through the vent valve to thereby communicate with the environment surrounding the aircraft. The dump valve is also selectively movable between opened and closed positions. The opened position of the dump valve allows the amount of compressed air to pass through the dump valve and to thereby actuate the store rack. The closed position of the dump valve prevents the amount of compressed air from passing through the dump valve.

While the principal advantages and features of the invention have been described above, a more complete and thorough understanding of the invention may be obtained by referring to the drawing and the detailed description of the preferred embodiment which follow.

Figure 1:
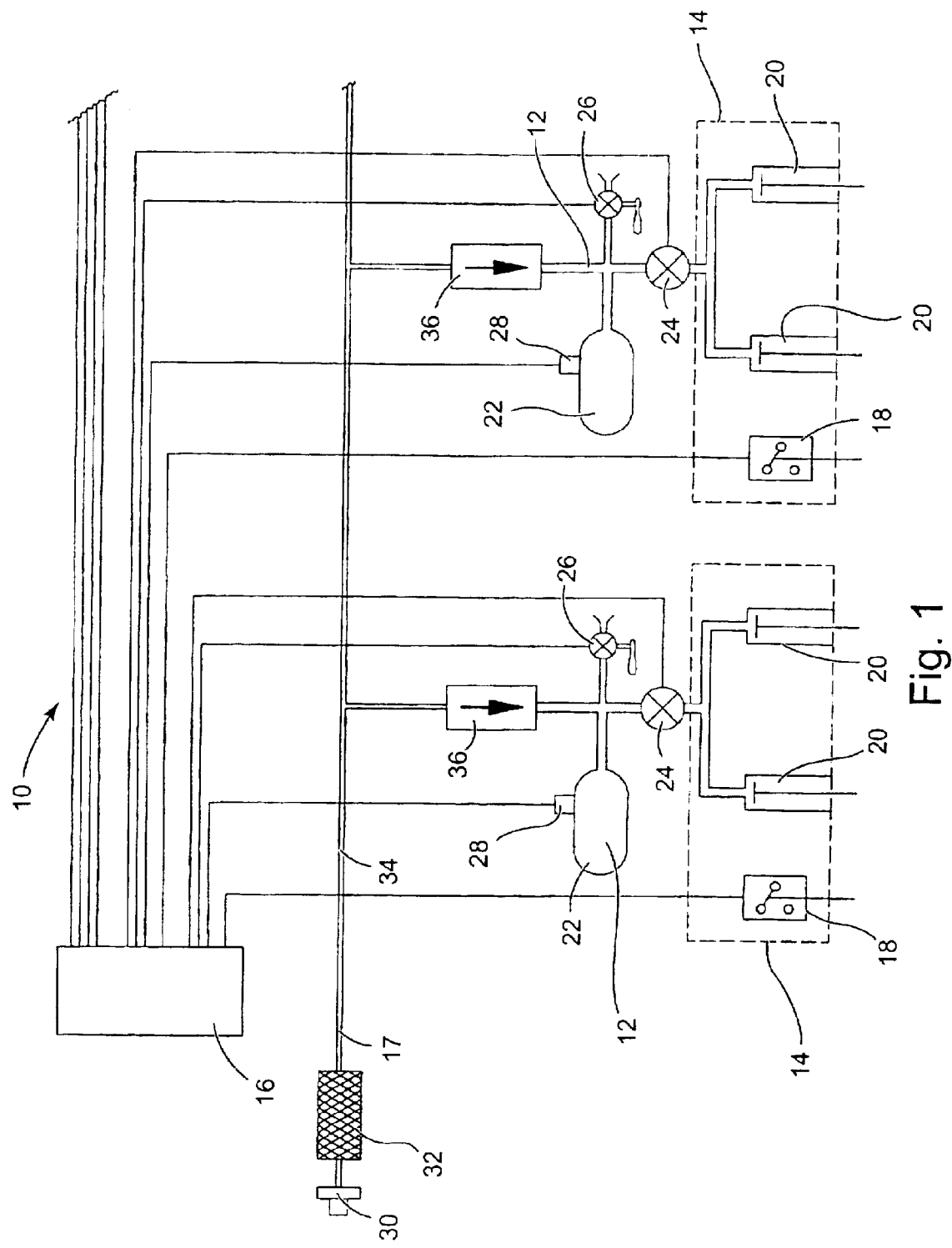
FIG. 1 is a schematic view of the ejection system utilized in connection with the preferred embodiment of the method of practicing the invention.

Reference characters in the written specification indicate corresponding items shown in the drawing figure.

DETAILED DESCRIPTION OF THE PREFERRED EMBODIMENT OF THE INVENTION

A schematic of the pneumatically actuated ejection system 10 utilized in the practicing of the preferred embodiment of the invention is shown in FIG. 1. It should be appreciated that the invention can be used in connection with virtually any type of pneumatically actuated ejection system, and therefore the structural details of the particular type of release mechanisms and/or ejection rams are not disclosed herein. Moreover, the pneumatically actuated ejection system 10 utilized with the invention comprises conventional components well known in the relevant industry and it should be appreciated that it is only the procedure of using such components that is of particular relevance to the invention.

The pneumatically actuated ejection system 10 of the preferred embodiment comprises one or more gas storage systems 12, one or more store racks 14, a stores management system 16, and a gas fill system 17. Each of the store racks 14 is configured to releasably attach a store to an aircraft. The gas storage system 12 is configured and adapted to supply the power necessary to actuate the store rack 14 to thereby release a store from the aircraft when desired. The stores management system 16 is housed within the aircraft and is operatively connected to the gas storage systems 12 and the store racks 14 to thereby control their operation. Finally, the gas fill system is configured to supply compressed gas to the gas storage system 12.

For purposes of explaining the invention in greater detail without discussing cumulative information, only one gas storage system and one store rack are hereinafter discussed. Nonetheless, it should be appreciated that more than one store rack could be operated in connection with one or more gas storage systems and that any one gas storage system could be a sub-portion of a larger gas storage system.

The store rack 14 is preferably a conventional store rack of the type that comprise a mechanical release mechanism 18 and one or more pneumatically driven ejector rams 20. The release mechanism 18 is configured and adapted to selectively and releasably secure a store to the aircraft. The ejector rams 20 are adapted to utilize compressed gas to force stores away from the aircraft when such stores are released.

The gas storage system 12 preferably comprises an accumulator 22, a dump valve 24, a vent valve 26, and a pressure sensor 28. The accumulator 22 is configured to store and contain compressed gas therewithin. The dump valve 24 is operatively connected to the accumulator 22 and is configured to selectively permit the compressed gas within the accumulator to communicate with, and thereby actuate, the ejector rams 20. The dump valve 24 is also configured to selectively prevent such communication/actuation. The vent valve 26 is also operatively connected to the accumulator 22 and is adapted and configured to selectively reduce the pressure of gas stored within the accumulator by allowing the release of a portion of the gas into the environment surrounding the aircraft. Like the dump valve 24, the vent valve is also configured to selectively prevent such release. Finally, the pressure sensor 28 is operatively connected to the stores management system 16 and is in communication with the gas stored in the accumulator 22. Thus, the pressure sensor 28 allows for detection of the pressure of compressed gas within the gas storage system 12.

The stores management system 16 is preferably a conventional electronic management system and is operatively connected to the various other components of the ejection system 10 preferably as shown in FIG. 1. However, it should be appreciated that the stores management system 16 could be in communication with more or less of the components and could even be absent depending on the configuration of the particular ejection system.

The gas fill system preferably comprises a gas fill port 30, a filter 32, a gas passageway 34, and one or more one-way check valves 36, all of which are preferably housed within the aircraft. The gas fill port 30 is configured and adapted to allow a source of compressed gas to be attached thereto in a manner such that the source of compressed gas can supply compressed gas to the gas passageway 34. The filter 32 is configured and adapted to prevent abrasive and/or corrosive particles from entering the gas passageway 34. The gas passageway 34 is connected to the gas storage system 12 via the check valve 36. The check valve 36 is in communication with the gas passageway 34 and the respective accumulator 22 in a manner allowing compressed gas within the gas passageway to pass into the accumulator. However, the purpose of the check valve is to prevent compressed gas within the accumulator 22 from passing back into the gas passageway.

Having described the various components of the ejection system 10, the preferred embodiment of the method of practicing the invention will now be described. Again, to avoid needless cumulative information, the operation of only one store rack and one gas storage system is described. Nonetheless, it should be appreciated that the method could be utilized with any number of store racks using any number of gas storage systems.

In use, a store is attached to the aircraft via one of the store racks 14 prior to the aircraft's flight. The pneumatically actuated ejection system 10 is also "charged" prior to the flight of the aircraft. The charging of the ejection system 10 is preferably performed by connecting a source of compressed gas to the gas fill port 30 of the gas fill system 17. The source of compressed gas is preferably a portable land-based compressor cart, but tanks of compressed gas could also be used and the source could be on board the aircraft. Moreover, the compressed gas is preferably air, but other compressible gases could be utilized.

During the charging process, the compressed gas from the source of compressed gas passes through the filter 32 and into the gas passageway 34. From the gas passageway 34, the compressed gas supplied via the source passes through the check valves 36 and into the accumulators 22, which presumably contain gas at a lower pressure. Throughout this procedure, the dump valve 24 and the vent valve 26 are in closed positions to prevent compressed gas from escaping from the accumulator 22. The supplying of compressed gas preferably continues until the compressed gas within each accumulator 22 reaches a gauge pressure of approximately 8,000 psi. Based on well known principles and laws of thermodynamics, this pressure value ensures that, even if the temperature of the gas is 165 degrees Fahrenheit at the time it is supplied, the gas within the accumulators 22 will have a pressure-to-temperature ratio in excess of 12.8 psia per degree Rankin. Thus, assuming the above-mentioned worst-case temperature condition, if no additional gas is added to the accumulator 22, the pressure of the gas would be at least approximately 5,376 psi at minus 40 degrees Fahrenheit. It should be appreciated that, because these pressures are relatively high compared to atmospheric pressures, whether gage pressures or absolute pressures are used is not significant and therefore needs not be taken into account.

After the compressed gas within the accumulator 22 reaches the desired pressure of 8,000 psi, the source of compressed gas is detached from the gas fill port 30 of the gas fill system 17 and remains detached from the aircraft throughout the aircraft's flight. The check valves 36 of the gas fill system 17 then operate to prevent the compressed gas within the accumulator 22 from flowing back into the gas fill system 17.

With the pneumatically actuated ejection system 10 charged and the source of compressed gas disconnected from the aircraft, the ejection system is ready for flight and for release of the stores attached thereto. During such flight, the aircraft and the ejection system 10 may experience variations in temperature as much as 200° F. For example, it is anticipated that the ejection system 10, and presumably the compressed gas stored therein, may range in temperature between −40° F. and positive 165° F. As known from the laws of thermodynamics, the pressure of the compressed gas within the accumulators 22 will fluctuate with changes in temperature so long as the volume of the gas remains constant. However, as mentioned above, by initially supplying the accumulators 22 with compressed gas at a pressure of 8,000 psia, even if initially at 165° F., the pressure within the accumulators would be at a pressure of approximately 5,376 psia at a temperature of −40° F. (assuming ideal gas conditions).

When desired during the flight of the aircraft, a store attached to one of the store racks 14 can be jettisoned from the aircraft via the pneumatically actuated ejection system 10. To do so, a control signal indicative of an intent to release the store is sent to the stores management system 16. In response to the control signal, the stores management system 16 communicates with the pressure sensor 28 of the gas storage system 12 to identify the present pressure of the compressed gas within the accumulator 22. The stores management system 16 also activates the vent valve 26 in response to the control signal to thereby allow compressed gas within the accumulator 22 to be discharged from the gas storage system 12, thereby reducing the pressure of the compressed gas within the accumulator. Once the pressure reaches a value between 4,750 psi and 5,250 psi, the stores management system 16 instructs the vent valve 26 to close and thereby prevents further reduction of the pressure of the compressed gas in the accumulator 22. After the pressure of the compressed gas within the accumulator 22 has been decreased to within the above-mentioned range, the stores management system 16 communicates with the release mechanism 18 of the store rack 14 to thereby unsecure the store from the store rack. Simultaneously or shortly thereafter, the stores management-system 16 sends a signal to open the dump valve 24. With the dump valve 24 open, the compressed gas within the accumulator 22 is able to flow into the ejector rams 20 of the store rack 14 causing them to forcibly eject the store from the aircraft.

From the foregoing, it should be appreciated that the present invention allows for the implementation of an ejection system that is capable of delivering a precise jettison ejection force without the need for onboard compressors and/or heating elements. In turn, this allows for a reduction in weight, parts, and/or costs associated with the ejection system. As such, the invention provides significant benefits and advantages over prior art methods of ejecting stores.

While the present invention has been described in reference to a specific embodiment, in light of the foregoing, it should be understood that all matter contained in the above description or shown in the accompanying drawing is intended to be interpreted as illustrative and not in a limiting sense and that various modifications and variations of the invention may be constructed without departing from the scope of the invention defined by the following claims. For example, it should be appreciated that, although the preferred embodiment is described as having separate accumulators for each store rack, a centralized accumulator could also be utilized in connection therewith or in place thereof. Additionally, it should be appreciated that the stores management system need not communicate directly with each of the components discussed in the preferred embodiment and

What is claimed is:

1. A method comprising:
   providing an aircraft having at least one pneumatically actuated store rack and a gas storage system;
   attaching a store to the store rack;
   supplying compressed gas to the gas storage system via a source of compressed gas in a manner such that the gas storage system contains an amount of compressed gas;
   decreasing the pressure of at least a portion of the amount of compressed gas by venting the gas storage system to an environment external to the aircraft in response to a control signal indicative of an instruction to release the store from the aircraft; and
   using the portion of the amount of compressed gas to actuate the store rack and thereby jettison the store from the aircraft, the utilization occurring after the step of decreasing the pressure of the portion of the amount of compressed gas.

2. A method comprising:
   providing an aircraft having at least one pneumatically actuated store rack and a gas storage system;
   attaching a store to the store rack;
   supplying compressed gas to the gas storage system via a source of compressed gas in a manner such that the gas storage system contains an amount of compressed gas;
   disconnecting the source of compressed gas from the aircraft, the disconnection occurring prior to flight of the aircraft and the source of compressed gas remaining disconnected from the aircraft when the aircraft is in flight;
   decreasing the pressure of at least a portion of the amount of compressed gas in response to a control signal indicative of an instruction to release the store from the aircraft; and
   using the portion of the amount of compressed gas to actuate the store rack and thereby jettison the store from the aircraft, the utilization occurring after the step of decreasing the pressure of the portion of the amount of compressed gas.

3. A method comprising:
   providing an aircraft having at least one pneumatically actuated store rack and a gas storage system;
   attaching a store to the store rack;
   supplying compressed gas to the gas storage system via a source of compressed gas in a manner such that the gas storage system contains an amount of compressed gas;
   decreasing the pressure of at least a portion of the amount of compressed gas in response to a control signal indicative of an instruction to release the store from the aircraft, the pressure being decreased to an extent such that the pressure is less than a maximum actuation pressure value;
   maintaining the amount of compressed gas within a pressure range that is greater than the maximum actuation pressure value throughout a period of time between the step of supplying compressed gas to the gas storage system and the step of decreasing the pressure of the portion of the amount of compressed gas; and
   using the portion of the amount of compressed gas to actuate the store rack and thereby jettison the store from the aircraft, the utilization occurring after the step of decreasing the pressure of the portion of the amount of compressed gas.

4. A method in accordance with claim 3 wherein the step of maintaining the amount of compressed gas within the pressure range is achieved without adding energy to the amount of compressed gas from any power source other than from ambient conditions surrounding the aircraft.

5. A method in accordance with claim 3 wherein the maximum actuation pressure value is at most 5,500 psia and wherein the pressure range is from 6,250 psia to 11,000 psia.

6. A method comprising:
   providing an aircraft having at least one pneumatically actuated store rack and a gas storage system;
   attaching a store to the store rack;
   supplying compressed gas to the gas storage system via a source of compressed gas in a manner such that the gas storage system contains an amount of compressed gas;
   predicting a minimum operational temperature of the amount of compressed gas during flight of the aircraft, the predicting assuming that energy is not added to the amount of compressed gas during flight from any power source other than from ambient conditions surrounding the aircraft and identifying a desirable pressure range for pneumatically actuating the store rack to jettison the store from the aircraft, the desirable pressure range defining a minimum pressure limit and a maximum pressure limit;
   determining an initial pressure for supplying the gas storage system with compressed gas such that the initial pressure of the compressed gas would be sufficient to ensure that the amount of compressed gas would have a pressure of at least the minimum pressure limit if the amount of compressed gas were to have a temperature equal to the minimum operational temperature limit, the step of supplying compressed gas to the gas storage system further comprising supplying compressed gas to the gas storage system in a manner such that an amount of compressed gas within the gas storage system has a pressure of at least the determined initial pressure immediately after the supplying terminates;
   decreasing the pressure of at least a portion of the amount of compressed gas in response to a control signal indicative of an instruction to release the store from the aircraft; and
   using the portion of the amount of compressed gas to actuate the store rack and thereby jettison the store from the aircraft, the utilization occurring after the step of decreasing the pressure of the portion of the amount of compressed gas.

7. A method in accordance with claim 6 wherein the determined initial pressure is such that the amount of compressed gas contained in the gas storage system has a pressure-to-temperature ratio of at least 12.0 psia/°R prior to the step of decreasing the pressure of the portion of the amount of compressed gas.

8. A method comprising:
   providing an aircraft having at least one pneumatically actuated store rack and a gas storage system;
   attaching a store to the store rack;
   supplying compressed gas to the gas storage system via a source of compressed gas in a manner such that the gas storage system contains an amount of compressed gas that has a pressure-to-temperature ratio of at least 12.0 psia/°R;
   disconnecting the source of compressed gas from the aircraft prior to flight of the aircraft, the source of compressed gas remaining disconnected from the aircraft when the aircraft is in flight;
   decreasing the pressure of at least a portion of the amount of compressed gas to an actuation pressure, the actuation pressure being within a range from 4,750 psia to 5,250 psia; and
   using the portion of the amount of compressed gas to actuate the store rack and thereby jettison the store from the aircraft, the utilization occurring after the step of decreasing the pressure of the portion of the amount of compressed gas to the actuation pressure.

9. A method in accordance with claim 8 wherein the step of decreasing the pressure of the portion of the amount of compressed gas occurs in response to a control signal indicative of an instruction to release the store from the aircraft.

10. A method in accordance with claim 8 further comprising the steps of:
   predicting a minimum operational temperature of the amount of compressed gas within the gas storage system during flight of the aircraft, the predicting assuming that energy is not added to the compressed gas during flight from any power source other than from ambient conditions surrounding the aircraft; and
   determining an initial pressure for supplying the gas storage system with compressed gas such that the initial pressure of the amount of compressed gas would be sufficient to ensure that the amount of compressed gas would have a pressure of at least 4,750 psia if the amount of compressed gas were to have a temperature equal to the minimum operational temperature limit.

11. A method in accordance with claim 8 wherein the step of supplying compressed gas to the gas storage system comprises supplying the compressed gas in a manner such that the amount of compressed gas contained by the gas storage system has a pressure of at least 7,500 psia immediately after the supplying terminates.

12. A method in accordance with claim 8 further comprising the step of maintaining the amount of compressed gas within a pressure range that is greater than 6000 psia throughout a period of time between the step of supplying compressed gas to the gas storage system and the step of decreasing the pressure of the portion of the amount of compressed gas.

13. A method in accordance with claim 12 wherein the step of maintaining the amount of compressed gas within the pressure range is achieved without adding energy to the amount of compressed gas from any power source other than from ambient conditions surrounding the aircraft.

14. A method comprising:
   providing an aircraft having at least one pneumatically actuated store rack and a gas storage system, the gas storage system being configured to contain compressed gas;
   attaching a store to the store rack;
   predicting a minimum operational temperature of compressed gas within the gas storage system likely to occur during flight of the aircraft, the predicting assuming that energy is not added to the compressed gas during flight from any power source other than from ambient conditions surrounding the aircraft;
   identifying a desirable pressure range of compressed gas for pneumatically actuating the store rack to jettison the store from the aircraft, the desirable pressure range defining a minimum pressure limit and a maximum pressure limit;
   determining an initial pressure for supplying the gas storage system with compressed gas such that the initial pressure of the compressed gas would be sufficient to ensure that the compressed gas would have a pressure of at least the minimum pressure limit if the compressed gas were to have a temperature equal to the minimum operational temperature limit;
   supplying compressed gas to the gas storage system via a source of compressed gas in a manner such that an amount of compressed gas within the gas storage system has a pressure of at least the determined initial pressure;
   decreasing the pressure of at least a portion of the amount of compressed gas in manner such that the pressure of the portion is within the desirable pressure range; and
   using the portion of the amount of compressed gas to actuate the store rack and thereby jettison the store from the aircraft, the utilization occurring after the step of decreasing the pressure of the portion of the amount of compressed gas.

15. A method in accordance with claim 14 wherein the step of decreasing the pressure of the portion of the amount of compressed gas occurs in response to a control signal indicative of an instruction to release the store from the aircraft.

16. A method in accordance with claim 14 wherein the step of determining an initial pressure comprises determining the initial pressure to be at least 7,500 psia.

17. A method in accordance with claim 14 further comprising the step of disconnecting the source of compressed gas from the aircraft, the disconnection occurring prior to flight of the aircraft and the source of compressed gas remaining disconnected from the aircraft when the aircraft is in flight.

18. A method in accordance with claim 14 further comprising the step of maintaining the amount of compressed gas within a pressure range that is greater than 6,000 psia throughout a period of time between the step of supplying compressed gas to the gas storage system and the step of decreasing the pressure of the portion of the amount of compressed gas.

19. A method in accordance with claim 18 wherein the step of maintaining the amount of compressed gas within the pressure range is achieved without adding energy to the amount of compressed gas from any power source other than from ambient conditions surrounding the aircraft.

20. A method in accordance with claim 19 wherein the step of decreasing the pressure of the portion of the amount of compressed gas occurs in response to a control signal indicative of an instruction to release the store from the aircraft.

21. A store ejection system comprising:
   an aircraft having at least one pneumatically actuated store rack and a gas storage system;
   an amount of compressed gas, the amount of compressed gas being stored within the gas storage system;

a store attached to the store rack;

a vent valve operatively connected to the gas storage system, the vent valve being selectively movable between opened and closed positions, the opened position of the vent valve allowing the amount of compressed air to be in communication with an environment surrounding the aircraft and to pass through the vent valve, the closed position of the vent valve preventing the amount of compressed air from passing through the vent valve to thereby communicate with the environment surrounding the aircraft;

a stores management system, the stores management system being operatively connected to the vent valve and being configured to transmit a control signal indicative of an intent to release the store from the store rack, the vent valve being responsive to the control signal in a manner such that the vent valve is selectively moved from the closed position to the opened position in response to the control signal; and a dump valve, the dump valve being selectively movable between opened and closed positions, the opened position of the dump valve allowing the amount of compressed air to pass through the dump valve and to thereby actuate the store rack, the closed position of the dump valve preventing the amount of compressed air from passing through the dump valve, the dump valve being responsive to the control signal in a manner such that the dump valve is selectively moved from the closed position to the opened position in response to the control signal after the vent valve is selectively moved from the closed position to the opened position in response to the control signal.

22. A store ejection system comprising:

an aircraft having at least one pneumatically actuated store rack and a gas storage system;

an amount of compressed gas, the amount of compressed gas being stored within the gas storage system at a pressure-to-temperature ratio of at least 12.0 psia/°R;

a store attached to the store rack;

a vent valve operatively connected to the gas storage system, the vent valve being selectively movable between opened and closed positions, the opened position of the vent valve allowing the amount of compressed air to be in communication with an environment surrounding the aircraft and to pass through the vent valve, the closed position of the vent valve preventing the amount of compressed air from passing through the vent valve to thereby communicate with the environment surrounding the aircraft;

a stores management system, the stores management system being operatively connected to the vent valve and being configured to transmit a control signal indicative of an intent to release the store from the store rack, the vent valve being responsive to the control signal in a manner such that the vent valve is selectively moved from the closed position to the opened position in response to the control signal; and a dump valve, the dump valve being selectively movable between opened and closed positions the opened position of the dump valve allowing the amount of compressed air to pass through the dump valve and to thereby actuate the store rack, the closed position of the dump valve preventing the amount of compressed air from passing through the dump valve, the dump valve being responsive to the control signal in a manner such that the dump valve is selectively moved from the closed position to the opened position in response to the control signal.

23. A store ejection system in accordance with claim 22, wherein the amount of compressed gas has a pressure of at least 7,000 psia.

24. A store ejection system comprising:

an aircraft having at least one pneumatically actuated store rack and a gas storage system;

an amount of compressed gas, the amount of compressed gas being stored within the gas storage system, the aircraft being devoid of any means for adding energy to the amount of compressed gas from any power source other than from ambient conditions surrounding the aircraft;

a store attached to the store rack;

a vent valve operatively connected to the gas storage system, the vent valve being selectively movable between opened and closed positions, the opened position of the vent valve allowing the amount of compressed air to be in communication with an environment surrounding the aircraft and to pass through the vent valve, the closed position of the vent valve preventing the amount of compressed air from passing through the vent valve to thereby communicate with the environment surrounding the aircraft;

a stores management system, the stores management system being operatively connected to the vent valve and being configured to transmit a control signal indicative of an intent to release the store from the store rack, the vent valve being responsive to the control signal in a manner such that the vent valve is selectively moved from the closed position to the opened position in response to the control signal; and a dump valve, the dump valve being selectively movable between opened and closed positions, the opened position of the dump valve allowing the amount of compressed air to pass through the dump valve and to thereby actuate the store rack, the closed position of the dump valve preventing the amount of compressed air from passing through the dump valve, the dump valve being responsive to the control signal in a manner such that the dump valve is selectively moved from the closed position to the opened position in response to the control signal.

25. A store ejection system comprising:

an aircraft having at least one pneumatically actuated store rack and a gas storage system;

an amount of compressed gas, the amount of compressed gas being stored within the gas storage system, the amount of compressed gas being at a pressure in excess of 8,000 psia;

a vent valve operatively connected to the gas storage system, the vent valve being selectively movable between opened and closed positions, the opened position of the vent valve allowing the amount of compressed air to be in communication with an environment surrounding the aircraft and to pass through the vent valve, the closed position of the vent valve preventing the amount of compressed air from passing through the vent valve to thereby communicate with the environment surrounding the aircraft;

a dump valve, the dump valve being selectively movable between opened and closed positions, the opened position of the dump valve allowing the amount of compressed air to pass through the dump valve and to thereby actuate the store rack, the closed position of the dump valve preventing the amount of compressed air from passing through the dump valve.

* * * * *